United States Patent
Chao

(10) Patent No.: US 6,511,732 B1
(45) Date of Patent: Jan. 28, 2003

(54) CUSHION FOR HANDLE OF RACKET

(76) Inventor: Ling-Mo Chao, P.O. Box 55-175, Taichung (TW)

( * ) Notice: Subject to any disclaimer, the term of this patent is extended or adjusted under 35 U.S.C. 154(b) by 159 days.

(21) Appl. No.: 09/629,472

(22) Filed: Jul. 31, 2000

(30) Foreign Application Priority Data

Aug. 6, 1999 (TW) ......................................... 088213537

(51) Int. Cl.$^7$ ............................. B32B 3/10; A63B 49/08
(52) U.S. Cl. ..................... 428/138; 428/172; 473/300; 473/521; 473/549; 473/550; 74/551.9; 16/430; 15/143.1
(58) Field of Search ................................. 428/172, 137, 428/138, 913; 74/551.8, 551.9, 558.5; 473/200, 300, 302, 568, FOR 173, FOR 194, 521, 549, 550; 81/489; 15/143.1; 16/430

(56) References Cited

U.S. PATENT DOCUMENTS

| 1,435,088 | A | * | 11/1922 | Smith .......................... 473/302 |
| 3,614,100 | A | * | 10/1971 | Spitz ........................... 473/302 |
| 4,174,109 | A | * | 11/1979 | Gaiser .......................... 473/302 |
| 5,055,340 | A | * | 10/1991 | Matsumura et al. ........ 428/172 |

* cited by examiner

*Primary Examiner*—Donald J. Loney

(57) ABSTRACT

A cushion for handle of racket comprises, from bottom to top, a fabric layer, a permeable layer, and a smooth flat waterproof layer. The permeable layer has a flat bottom surface and an undulating top surface wherein the raised portions of the top surface of the permeable layer project above the waterproof layer to form a plurality of absorption irregular areas for absorbing sweat and heat given forth from hand when holding the racket. Further, absorption areas has a high frictional coefficient. This can increase the grasping force of the hand of user on racket.

2 Claims, 5 Drawing Sheets

CUSHION FOR HANDLE OF RACKET

FIELD OF THE INVENTION

The present invention relates to rackets and more particularly to an improved cushion for handle of racket.

BACKGROUND OF THE INVENTION

Conventionally, a cushion is disposed around handle of a racket to provide the user with a degree of comfort while holding the racket. An angled cross-sectional view of a conventional cushion 1 wrapped around handle of racket is shown in FIG. 1. The cushion 1 consists of a bottom fabric layer 3, a middle polyurethane (PU) layer 2, and a top smooth flat waterproof layer 4 wherein fabric layer 3 is glued on top and bottom surfaces so as to adhere to handle and PU layer 2. As a result, user can hold the handle.

But this is unsatisfactory for the purpose for which the invention is concerned because frictional force between hand and cushion 1 is not sufficient due to the low frictional coefficient and the non-permeable nature of waterproof layer 4. As such, user has to exert a great force to hold handle. Otherwise, handle may be separated from hand in exercising. Also, such holding handle with great force tends to cause fatigue to user when playing a game for a relative long period of time. Further, user may feel uncomfortable in holding such handle because waterproof layer 4 can not absorb sweat given forth by user.

An angled cross-sectional view of another conventional cushion 1' wrapped around handle of racket is shown in FIG. 2. The cushion 1' also consists of a bottom fabric layer 3', a middle polyurethane (PU) layer 2', and a top smooth flat waterproof layer 4'. The difference between this and above conventional designs is that a plurality of parallel spaced elongate recesses 5' are formed on waterproof layer 4'. As such, part of PU layer 2' is exposed. It is designed that PU layer 2' is in contact with hand when user holds handle. Further, the frictional coefficient of PU layer 2' is relative large. As a result, user can hold tightly on the handle because a sufficient friction between hand and cushion 1' is obtained. Also, user may feel a degree of comfort in holding such handle because sweat given forth on the hand in exercising may pass through the porous body of PU layer 2' to dissipate. This may prolong the holding time of racket by user without feeling fatigue.

However, the second previous design suffered from a disadvantage. That is, an abrader with special designed rims is required to abrade waterproof layer 4' to form recesses 5'. Such abrader can only work on this function. It is understood that a new abrader with corresponding rims is required if the shapes and configuration of recesses 5' are changed. This is not cost effective. Further, it does not conform to the requirements of small quantity and variety of recesses 5'.

Thus, it is desirable to provide an improved cushion for handle of racket in order to overcome the above drawbacks of prior art.

SUMMARY OF THE INVENTION

It is an object of the present invention to provide a cushion for handle of racket comprising, from bottom to top, a fabric layer, a permeable layer, and a smooth flat waterproof layer. The permeable layer has a flat bottom surface and an undulating top surface wherein the raised portions of the top surface of the permeable layer project above the waterproof layer to form a plurality of absorption irregular areas for absorbing sweat and heat given forth from hand when holding the racket. Further, absorption areas has a high frictional coefficient. This can increase the grasping force of the hand of user on racket.

The above and other objects, features and advantages of the present invention will become apparent from the following detailed description taken with the accompanying drawings.

DETAILED DESCRIPTION OF THE PREFERRED EMBODIMENTS

Figure 1:
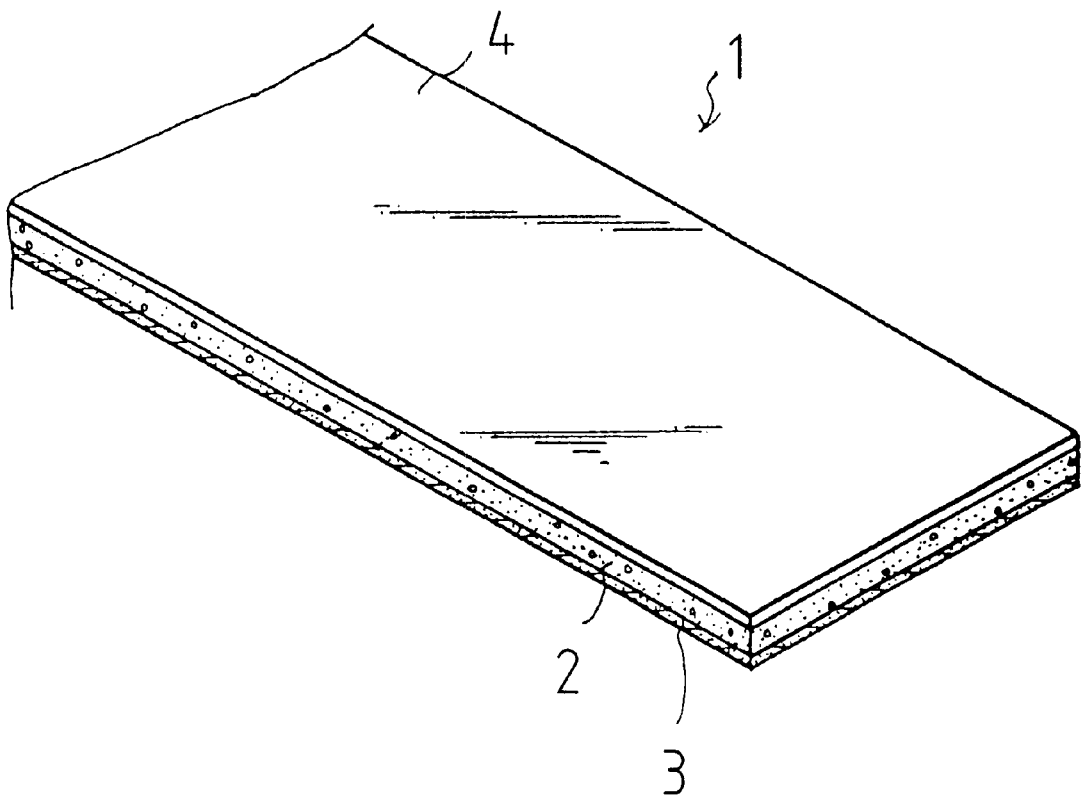
FIG. 1 is an angled cross-sectional view of a conventional cushion.
Figure 2:
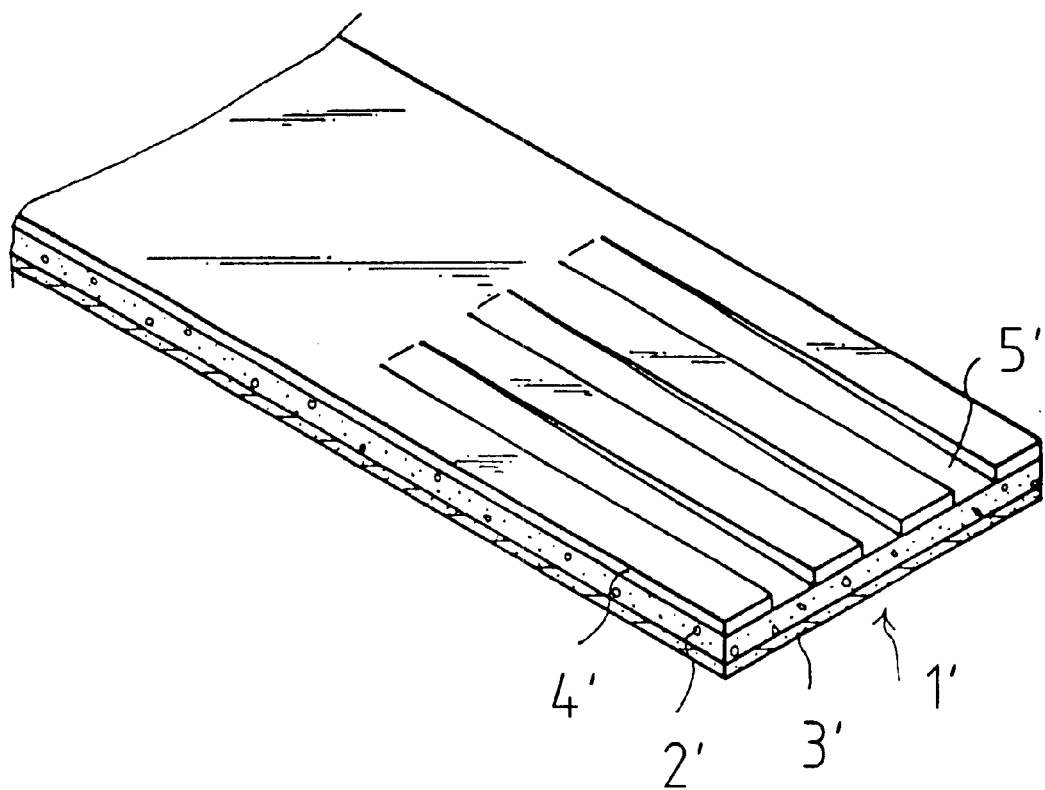
FIG. 2 is an angled cross-sectional view of another conventional cushion.
Figure 3:
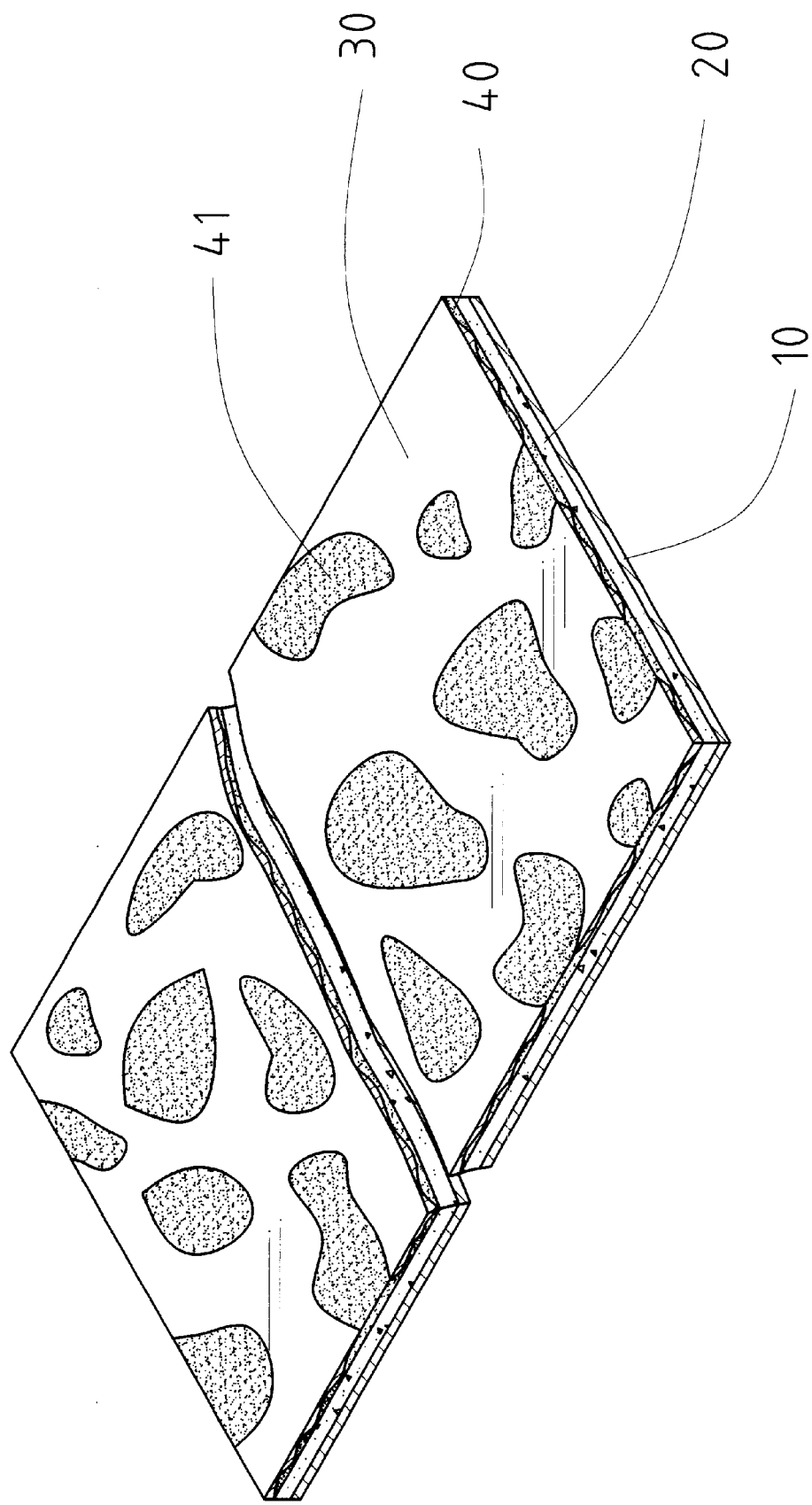
FIG. 3 is an angled cross-sectional view of a first preferred embodiment of cushion for handle of racket according to the invention.
Figure 4:
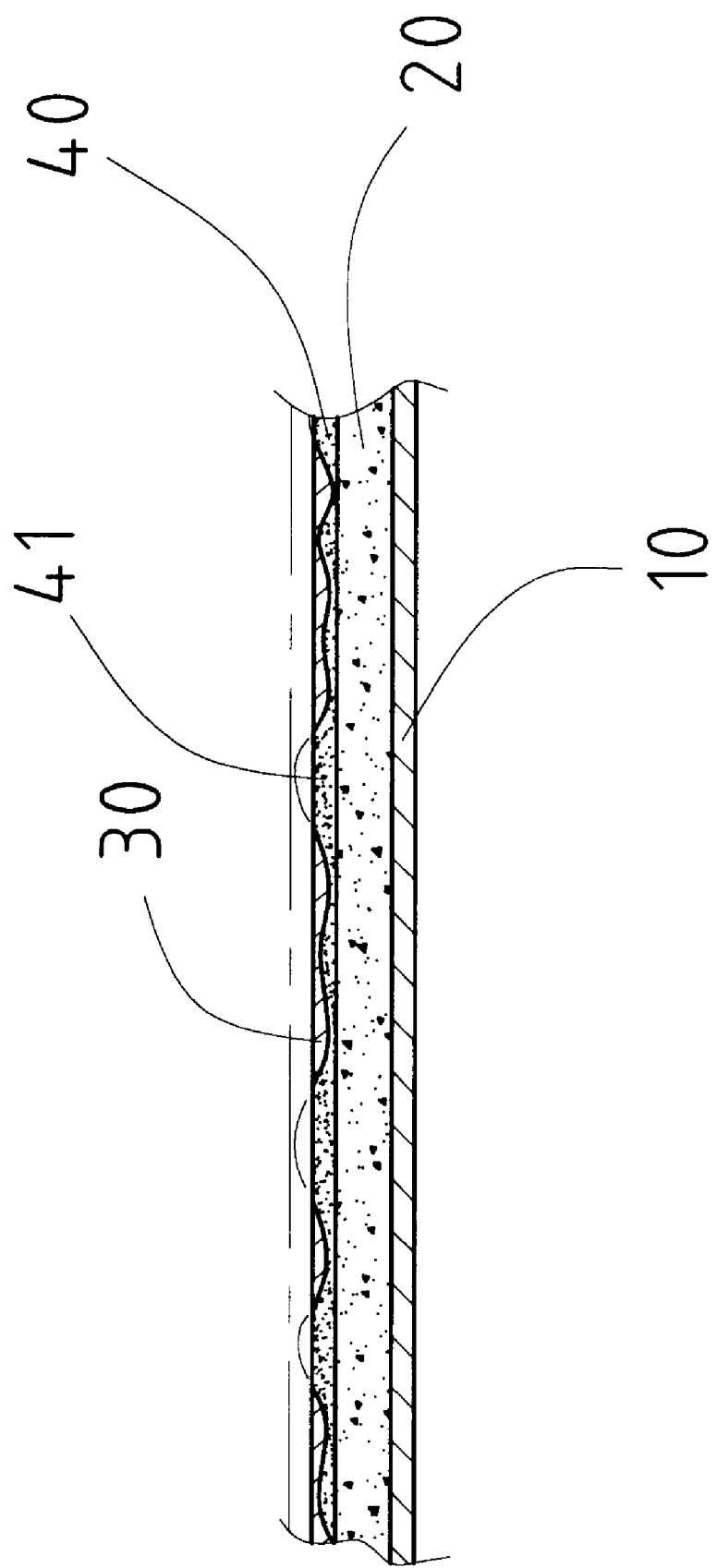
FIG. 4 is a cross-sectional view of FIG. 3.

Referring to FIGS. 3 and 4, there is shown a cushion for handle of racket constructed in accordance with the invention. Cushion comprises, from bottom to top, a fabric layer 10, an elastic layer 20 made of polyurethane (PU) material, a permeable layer 40, and a smooth flat waterproof layer 30. All above elements except permeable layer 40 are prior art. Thus a detailed description thereof is omitted herein for the sake of brevity.

Permeable layer 40 has a varying thickness. Permeable layer 40 has a flat bottom surface and an undulating top surface wherein the raised portions of the top surface of permeable layer 40 project above waterproof layer 30 to form a plurality of absorption areas 41 for absorbing sweat and heat given forth from hand. Further, these absorption areas 41 has a high frictional coefficient. This can increase the grasping force of the hand of user on racket. As a result, user can hold a racket having handle wrapped with the cushion of the invention for a relatively long period of time without feeling fatigue.

In manufacturing such improved cushion, first wrap fabric layer 10 and elastic layer 20 around handle sequentially. Next, coat adhesive on the bottom surface of permeable layer 40 so as to glue on elastic layer 20. Then form waterproof layer 30 on permeable layer 40 by a known technique. This waterproof layer 30 is smooth and flat. Finally, abrade the raised portions of permeable layer 40 projected above waterproof layer 30 to form a plurality of absorption areas 41.

Abrader for abrading above raised portions of permeable layer 40 is commercially available. As such, there in no need to prepare a specially designed abrader with rims according to the invention. This has the advantages of cost effective, conformed to the requirements of small quantity and variety of absorption areas 41.

Figure 5:
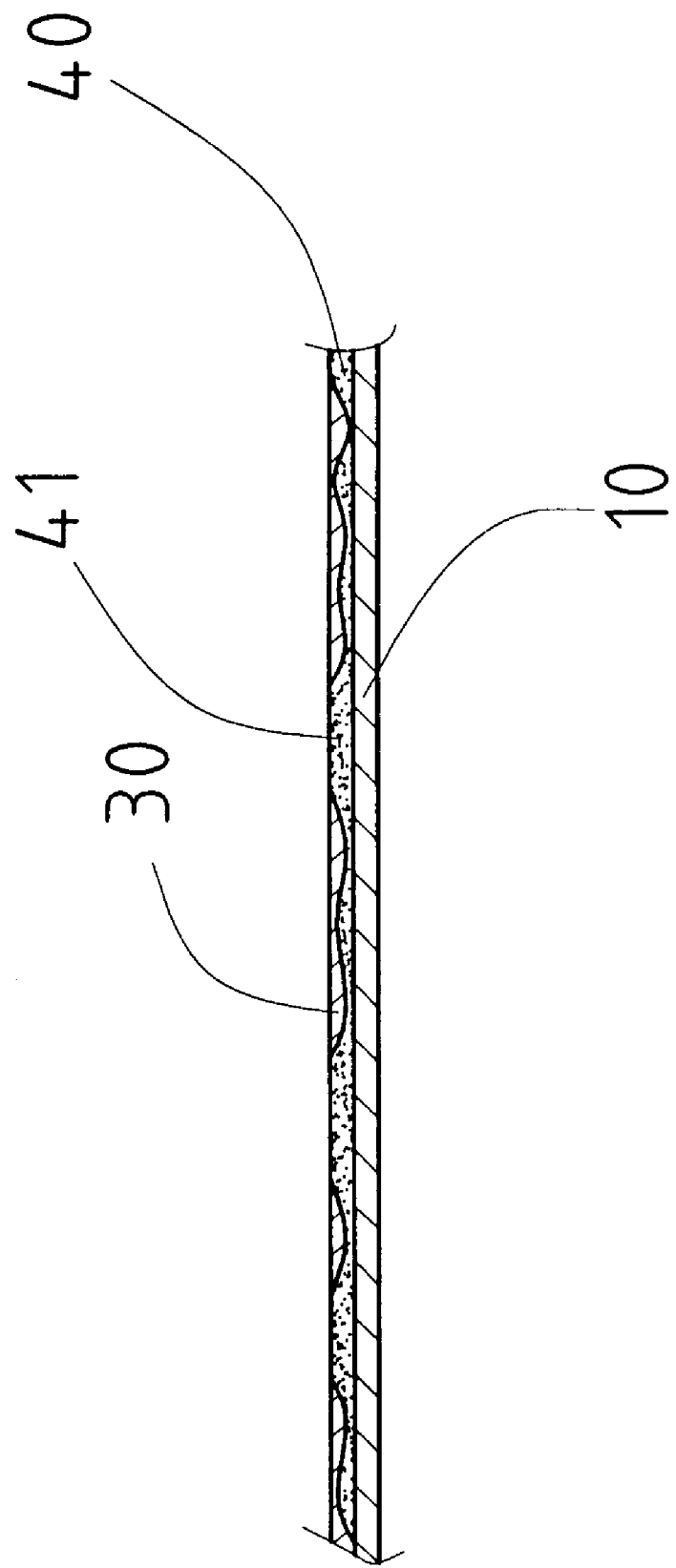
FIG. 5 is a cross-sectional view of a second preferred embodiment of cushion for handle of racket according to the invention.

Referring to FIG. 5, there is shown a second preferred embodiment of cushion according to the invention. The only difference between this and the first embodiments is that the elastic layer 20 is eliminated.

While the invention herein disclosed has been described by means of specific embodiments, numerous modifications and variations could be made thereto by those skilled in the art without departing from the scope and spirit of the invention set forth in the claims.

What is claimed is:

1. A cushion wrapped around the handle of a racket comprising:

a bottom fabric layer;

a middle permeable layer having a flat bottom surface and an undulating top face, the undulating top face of the middle permeable layer having a plurality of raised portions; and a top waterproof layer having a plurality of irregular holes;

wherein the raised portions of the undulating top surface of the middle permeable layer are respectively extended through the irregular holes of the top waterproof layer to form a plurality of discontinuous and irregular absorption areas in the top waterproof layer for absorbing sweat and heat.

2. The cushion of claim 1, further comprising an elastic layer disposed between the fabric layer and the permeable layer.

* * * * *